UNITED STATES PATENT OFFICE.

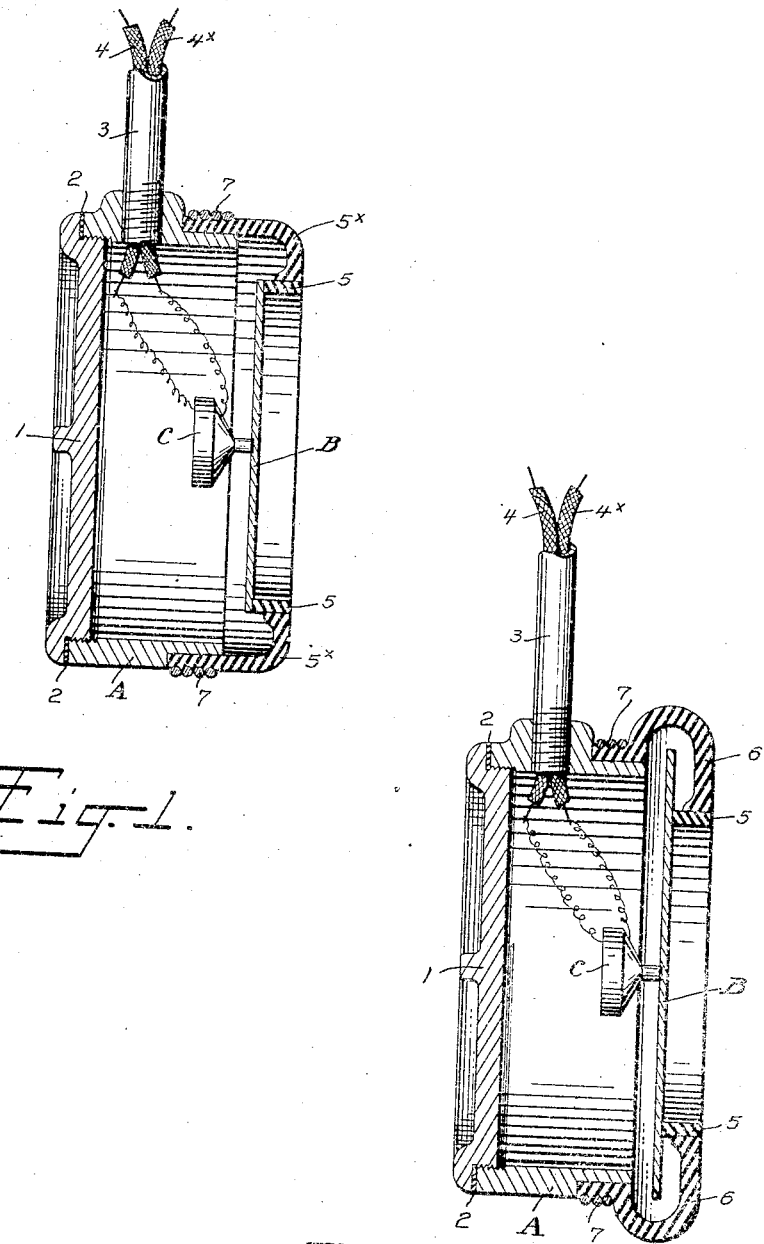

HENRY R. GILSON, OF NEW ROCHELLE, NEW YORK, ASSIGNOR TO THE MECHANICAL RUBBER COMPANY, A CORPORATION OF NEW JERSEY.

SUBMARINE TELEPHONIC TRANSMITTER.

1,400,283.   Specification of Letters Patent.   Patented Dec. 13, 1921.

Application filed September 25, 1918. Serial No. 255,568.

*To all whom it may concern:*

Be it known that I, HENRY R. GILSON, a citizen of the United States, residing at New Rochelle, in the county of Westchester and State of New York, have invented certain new and useful Improvements in Submarine Telephonic Transmitters, of which the following is a full, clear, and exact description.

The principal object of the invention is the production of a submarine telephonic transmitter or "detector" possessing very great responsiveness, and of such character that it may utilize selective tuned diaphragms without affecting the natural period of the latter, so that the sound waves of the desired period may be heard at their maximum to the exclusion of all extraneous noises.

A further object of the invention is to provide a detector which may be subjected to shock without affecting the mounting of the diaphragm and natural period of the latter.

The invention will be understood by reference to the accompanying drawings, in which:

Figure 1 is a cross-sectional view of an apparatus embodying the invention, and

Fig. 2 is a cross-sectional view illustrating a modification of the apparatus.

By reference to Fig. 1 of the drawings, it will be seen that the apparatus comprises an annular casing A into which is threaded at one end a closure plate 1, a packing 2 being employed between the margin of the plate and the casing to exclude water. Into the side of the casing A is threaded a conduit 3 for the admission of the insulated wires 4, 4ˣ leading to the conducting cup C, the latter being mounted directly upon the diaphragm B. The conducting cup C may contain any suitable microphonic material, and its construction may be in accordance with the usual practice of the art.

The support for the diaphragm comprises a ring 5 of rubber or other resilient material, preferably vulcanized to the diaphragm, the said ring being in turn fitted within a flanged annulus 5ˣ having a suitable water tight connection with the casing A. In the present instance the flanged annulus 5ˣ is formed of vulcanized rubber or other resilient material for a purpose to be hereinafter referred to. The diaphragm may be of brass or other suitable material.

It will be seen that in the construction just described the diaphragm is suspended, out of contact with any metal part of the casing, by means of a resilient aperiodic supporting member. Such a construction avoids one of the principal causes of damping and distortion of transmitted sounds, to wit: the contact of the diaphragm with a metallic member of the casing, the latter offering resistance to the natural vibration of the diaphragm and thus affecting the natural periodicity of the latter. In the apparatus of the present invention the diaphragm is so mounted that its natural period is maintained.

The present apparatus is such that the diaphragm may be completely formed prior to its installation in the apparatus. In other words, assuming the diaphragm prior to its installation in the apparatus to have a periodicity of twelve hundred vibrations per second, it will also have a periodicity of twelve hundred when installed in the apparatus. Where, as in the prior art, the diaphragm is rigidly mounted so as to contact with a metallic member within the casing, it is necessary to manufacture the diaphragm of a greater thickness than that finally required, and hence with a higher pitch, and then, after mounting the diaphragm, to face off the latter until after repeated tests, it is found that the diaphragm possesses the proper period.

It has hereinbefore been stated that in the present embodiment of the invention the flanged annulus 5ˣ is formed of rubber or other resilient material. The purpose of such construction is to permit the inward movement of the diaphragm under the pressure of the water, until the fluid pressures on opposite sides of the diaphragm are equalized. Thus, inasmuch as the interior of the casing is fluid tight, the diaphragm in its inward movement acts to compress the fluid, for example, air, contained within the said casing. By such construction the damping effect of the external pressure upon the diaphragm may be reduced or entirely avoided.

In the construction shown in Fig. 2, the diaphragm is mounted at a line which remains stationary during its natural vibration, in other words, at the nodal line or circle. Ordinarily the diameter of the nodal circle is about two thirds that of the diaphragm, or to be more exact, .68 of the diameter of the diaphragm. In the vibration of the diaphragm the area within the nodal circle and the area outside of the nodal circle move in opposite directions. Therefore in this embodiment of the invention the part of the diaphragm outside of the nodal circle is provided with a shield so that the energy from the sound waves will not be exerted over the entire surface of the diaphragm and so tend to push both the inner and outer parts in the same direction at the same time. The said shield consists of the annulus 6 which is secured at 7 to the casing A and which is arched about the periphery of the diaphragm.

The mounting of the diaphragm at points which under natural vibration of the diaphragm remain stationary, very much increases the ease with which the diaphragm is set in motion and thus greatly increases the sensitiveness of the apparatus. Furthermore, when the sound-wave impinges upon the diaphragm, the latter, owing to its resilient mounting, is permitted to move inwardly and outwardly, bodily, as well as to vibrate as a diaphragm. This inward and outward movement corresponds to what may be called piston vibration, and is in unison with the diaphragmatic vibration. The sum total of the piston vibration and diaphragmatic vibration will be in excess of the motion of a diaphragm which is mounted rigidly as a drum head for example, or one so mounted as to be capable of bodily movement, and yet resting upon a metallic supporting member. It will thus be seen that the sum of these two vibratory movements acting in unison, will provide greater energy to be imparted to the conducting cup or microphone, rendering the apparatus more sensitive and responsive, than would be the case provided energy from the diaphragmatic vibration alone was available.

While the invention is primarily intended for use as a submarine telephonic transmitter or detector, its broad principle is not restricted thereto, for it broadly comprehends the idea of clamping a diaphragm at a nodal circle or zone where there is no vibration. Therefore, use of the invention in sound-boxes for recording and reproducing purposes is contemplated.

Having thus described my invention, what I claim and desire to protect by Letters Patent is:

1. In a sound-box, in combination, a casing, a vibratory diaphragm, and a resilient support for said diaphragm attached thereto on a circle whose diameter is substantially two thirds that of the diaphragm.

2. The combination with a diaphragm case, of a flexible annulus supported by the case, and a diaphragm secured at its natural nodal circle to the said annulus.

3. In a submarine telephonic transmitter, a casing, a flexible annulus, a diaphragm mounted at its nodal circle upon the said annulus, a microphone, and a yielding supporting member for the said annulus whereby the diaphragm may move inwardly under external fluid pressure and act to compress fluid contained within the casing.

4. The combination with a diaphragm case, of a flexible annulus supported by the said case, and a diaphragm secured at its normal nodal circle by cohesion with the annulus.

Signed at New York, in the county and State of New York, this 24th day of September, 1918.

HENRY R. GILSON.